(12) United States Patent
McIntosh (10) Patent No.: US 11,027,697 B2
(45) Date of Patent: Jun. 8, 2021

(54) SYSTEM, METHOD, AND APPARATUS TO MITIGATE AND OR PREVENT AUTONOMOUS VEHICLE MISUSE THROUGH THE USE OF SECURITY ENABLED SENSORS

(71) Applicant: Gordon David McIntosh, Austin, TX (US)

(72) Inventor: Gordon David McIntosh, Austin, TX (US)

(73) Assignee: ITSEC Analytics PTE. LTD., Singapore (SG)

( * ) Notice: Subject to any disclaimer, the term of this patent is extended or adjusted under 35 U.S.C. 154(b) by 0 days.

(21) Appl. No.: 16/244,092

(22) Filed: Jan. 9, 2019

(65) Prior Publication Data

US 2019/0248326 A1    Aug. 15, 2019

Related U.S. Application Data

(60) Provisional application No. 62/710,221, filed on Feb. 14, 2018, provisional application No. 62/762,452, filed on May 7, 2018.

(51) Int. Cl.
*B60R 25/20* (2013.01)
*G05D 1/00* (2006.01)

(52) U.S. Cl.
CPC ........ *B60R 25/2018* (2013.01); *G05D 1/0011* (2013.01)

(58) Field of Classification Search
None
See application file for complete search history.

(56) References Cited

U.S. PATENT DOCUMENTS

| | | | | | |
|---|---|---|---|---|---|
| 4,878,050 | A | * | 10/1989 | Kelley | B60R 25/04 340/12.54 |
| 6,151,539 | A | * | 11/2000 | Bergholz | G01S 17/89 701/25 |
| 9,688,288 | B1 | * | 6/2017 | Lathrop | G01C 21/3461 |
| 9,776,638 | B1 | * | 10/2017 | Green | G05D 1/0022 |
| 2007/0045018 | A1 | * | 3/2007 | Carter | B60T 7/16 180/167 |
| 2008/0086241 | A1 | * | 4/2008 | Phillips | G05D 1/0038 701/2 |
| 2008/0091309 | A1 | * | 4/2008 | Walker | B60T 8/4266 701/1 |
| 2010/0031036 | A1 | * | 2/2010 | Chauncey | H04L 63/1441 713/168 |
| 2013/0212659 | A1 | * | 8/2013 | Maher | H04W 4/44 726/6 |
| 2017/0364069 | A1 | * | 12/2017 | Colella | H04W 4/90 |
| 2018/0159693 | A1 | * | 6/2018 | Condeixa | H04L 9/3268 |
| 2019/0072979 | A1 | * | 3/2019 | Sukhomlinov | G06Q 20/14 |
| 2019/0187691 | A1 | * | 6/2019 | Magzimof | G07C 5/0808 |

* cited by examiner

*Primary Examiner* — Kaveh Abrishamkar

(57) ABSTRACT

Methods and systems for implementing autonomous vehicle security features. The present invention details an effective and secure methodology to implement the external management and control of autonomous vehicles by authorized personnel, usually law enforcement, through the use of intelligent sensors that can override an autonomous vehicle controller's functionality as necessary.

29 Claims, 11 Drawing Sheets

Figure 1

100
Autonomous Vehicle with
AV Controller
and Sensor System

Figure 2

Figure 3 – LSS Handheld Illuminator

Figure 4 – LSS Car Mounted Illuminator

Figure 5 – LSS Helicopter Mounted Illuminator

Figure 6 – Fixed LSS FENCE

600
LSS Manual Controller
Block Diagram

Figure 12 – DRIVER-LESS TRUCK WITH WIRED LSS MANUAL CONTROLLER

Figure 13 – DRIVER-LESS TRUCK WITH WIRELESS LSS MANUAL CONTROLLER

SYSTEM, METHOD, AND APPARATUS TO MITIGATE AND OR PREVENT AUTONOMOUS VEHICLE MISUSE THROUGH THE USE OF SECURITY ENABLED SENSORS

CROSS-REFERENCE TO RELATED APPLICATIONS

The present application claims priority to U.S. Provisional Application No. 62/710,221, filed Feb. 14, 2018, U.S. Provisional Application No. 62/762,453, filed May 7, 2018, the disclosures of which are incorporated by reference herein in their entirety.

TECHNICAL FIELD

The present invention relates generally to an improved data processing system and in particular to a method and apparatus for implementing security features using Autonomous Vehicle (AV) sensors. Still more particularly, the present invention provides for dedicated or integrated sensors that allow override of vehicle functions by authorized personnel, specifically allowing the shutdown and/or management of an AV by external means.

BACKGROUND OF THE INVENTION

The field of autonomous vehicle control is currently emerging as a promising technology that can reduce costs, reduce accidents and loss of life, reduce insurance premiums, increase productivity for workers in transit and potentially eliminate drunk driving and the associated losses; however, recent misuse of vehicles by terrorists demands that the technology be proactive to develop a comprehensive threat model, as well as mitigation and prevention methodologies rather than reacting to the consequences.

Autonomous vehicles are categorized by the Society of Automotive Engineers (SAE) in specification J3016, Autonomy Levels as follows:

Level 0: Automated system issues warnings and may momentarily intervene but has no sustained vehicle control.

Level 1: Driver and automated system shares control over the vehicle. An example would be Adaptive Cruise Control (ACC) where the driver controls steering and the automated system controls speed. Using Parking Assistance, steering is automated while speed is manual. The driver must be ready to retake full control at any time.

Level 2: The automated system takes full control of the vehicle accelerating, braking, and steering. The driver must monitor the driving and be prepared to immediately intervene at any time if the automated system fails to respond properly.

Level 3: The driver can safely turn their attention away from the driving tasks, e.g. the driver can text or watch a movie. The vehicle will handle situations that call for an immediate response, like emergency braking. The driver must still be prepared to intervene within some limited time when called upon by the vehicle to do so (specified by the manufacturer).

Level 4: As level 3, but no driver attention is ever required for safety, i.e. the driver may safely go to sleep or leave the driver's seat. Self driving is supported only in limited areas or under special circumstances, like traffic jams. Outside of these areas or circumstances, the vehicle must be able to safely abort the trip, i.e. park the car, if the driver does not retake control.

Level 5: No human intervention is required. e.g., robotic taxi.

Because of this recent technology's development, there are currently few commercially available autonomous vehicles available for sale worldwide, however, the very nature of an autonomous vehicle provides a large measure of anonymity and therefore the possibility of subsequent misuse. Additionally, a majority of the AVs under development are electric AVs that are much easier to drive and therefore will provide a larger potential for misuse. Misuse can be intentional as in the case of a terrorist's use of an autonomous truck to deliver explosive devices or mow down pedestrians in crowded venues; however, misuse can also be accidental as in the case of sensor failure, environmental conditions that interfere with sensor operations, driver medical issues, failure of mechanisms to secure vehicle loads, or third party misuse such as skitching or hooky bobbing, as well as any other of a multitude of real-world problems yet to be discovered.

It is clear that at AV Level 2 and above, where all control has been relinquished to the AV, there is the need for additional external control applied by authorized personnel, usually law enforcement, for mitigating and/or preventing misuse. At Level 2 after a driver has relinquished control, the driver could possibly have an incapacitating medical event that prevents proper control of the vehicle and if no external stimulus can provide access to the vehicle, the driver may not receive medical treatment promptly. As the level of autonomy increases, there are many additional factors that demand the development of a comprehensive policy and threat model, as well as mitigation and prevention methodologies. The policies and methodologies must meet all regulatory requirements for all jurisdictions where the AV is operated as the industry is subject to many additional rules and regulations such as required by the USG Federal Motor Carrier Safety Administration (FMCSA) e.g., Federal Motor Carrier Safety Regulations (FMCSRs).

The trucking industry is heavily regulated and in the normal course of business, Level 1 Class 8 vehicles are frequently required to stop for various inspections; in transit, intrastate weigh stations, border weigh stations, agricultural, etc. Additionally, law enforcement is frequently required to pull these vehicles over (lawfully stop) to issue violations for overweight loads, safety violations, or to alert the driver there are issues with vehicle or load. Level 5 vehicles do not magically make these disappear, law enforcement will have the same (and possibly more) reasons to stop the vehicle.

A partial list of requirements for lawful stop and search of Level 2 and above AVs are as follows:

A) The connection protocol must provide cryptographic mechanisms to:
  1) identify and authenticate the entity performing Lawful Stop as authorized law enforcement personnel,
  2) command messages and replies must be confidential and free of errors,
  3) messages must have both non-repudiation of origin and non-repudiation of receipt B) In non-emergency situations:
  1) Indicate law enforcement's command received and action is in progress
  2) If message is "Stop", the AV must safely pull off the right of way and stop, and:
    a) communicate with dispatch
      i) Notify owner/operator the vehicle is being stopped
      ii) Send law enforcement's credentials for records 1) Identification,
2) Method for authentication
3) Jurisdiction,
4) location and time,
  b) communicate with law enforcement to provide any necessary information,
3) possibly relinquish control of vehicle to law enforcement,
4) unlock cargo compartment upon request for inspection,
5) lock cargo compartment,
6) safely retake control of the vehicle,
7) safely resume operation,
C) If message is "EmergencyStop", the AV must apply all means to stop immediately,
D) Obey all "Fence" commands immediately by requesting reroute map and immediately reroute around restricted area.

Currently, the lawful stop of a vehicle depends on visual verification of law enforcement, i.e., the police vehicle, police uniform and the badge; unfortunately, unmarked police cars and a rising mistrust of law enforcement makes these inadequate, if a computer could perform these actions. The opportunity to improve these outdated metrics and move to secure methodologies requires that Level 2 and above autonomous vehicles use the best technology available and that was designed to provide law enforcement's identification and authentication, message integrity, message confidentiality, non-repudiation of origin and non-repudiation of receipt.

The current marketing blitz being waged by more than 20 AV manufacturers doesn't discuss AV Control System security, the use of recognized international standards for software development or the testing methodologies of the AV control system. They certainly don't disclose the dangers posed to the public by AVs used responsibly, or under normal misuse cases, or much less, the use of these vehicles by terrorists. Without secure control systems, i.e., developed with secure development practices, tested, evaluated and approved by third party experts, AVs are easily usable by terrorists as delivery programs for weapons.

Therefore, all Level 2 and above AVs must implement lawful stop and search that is independent of the vehicle's controller. Because all computer systems are much more vulnerable to exploit when an attacker has physical control of the device, the lawful controller must be implemented in a tamper-proof enclosure, as should the vehicle controller, sensor system, and all sensor wiring. It is recommended that a FIPS 140-2 Level 4 specification be used for guidance.

Additionally, the software and hardware should be subject to review by third party experts; it is suggested as a minimum that they undergo a Common Criteria evaluation as well as FIPS 140-2 Level 4 certification.

Most importantly, lawful stop and search must take into account that any Level 2 and above AV can be effectively used as a terrorist's weapon acting a great distance. When contemplating the use of Class 8 AVs as a weapon, the true gravity of the situation appears clear, an 80,000 lb weapon is frightening and cannot be ignored.

It is readily apparent that many threats and extensive regulations are present, but unsolved for this emerging technology; therefore, it would be advantageous to have an improved method and apparatus to prevent autonomous vehicle misuse.

SUMMARY OF THE INVENTION

The present invention provides a system, method and apparatus to prevent autonomous vehicle misuse. The exemplary aspects of the present invention details an effective and secure methodology to implement the external management and/or shutdown of autonomous vehicles by authorized personnel through the use of intelligent sensors that can override functionality as necessary.

BRIEF DESCRIPTION OF THE DRAWINGS

The novel features believed characteristic of the invention are set forth in the appended claims; however, the invention itself, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
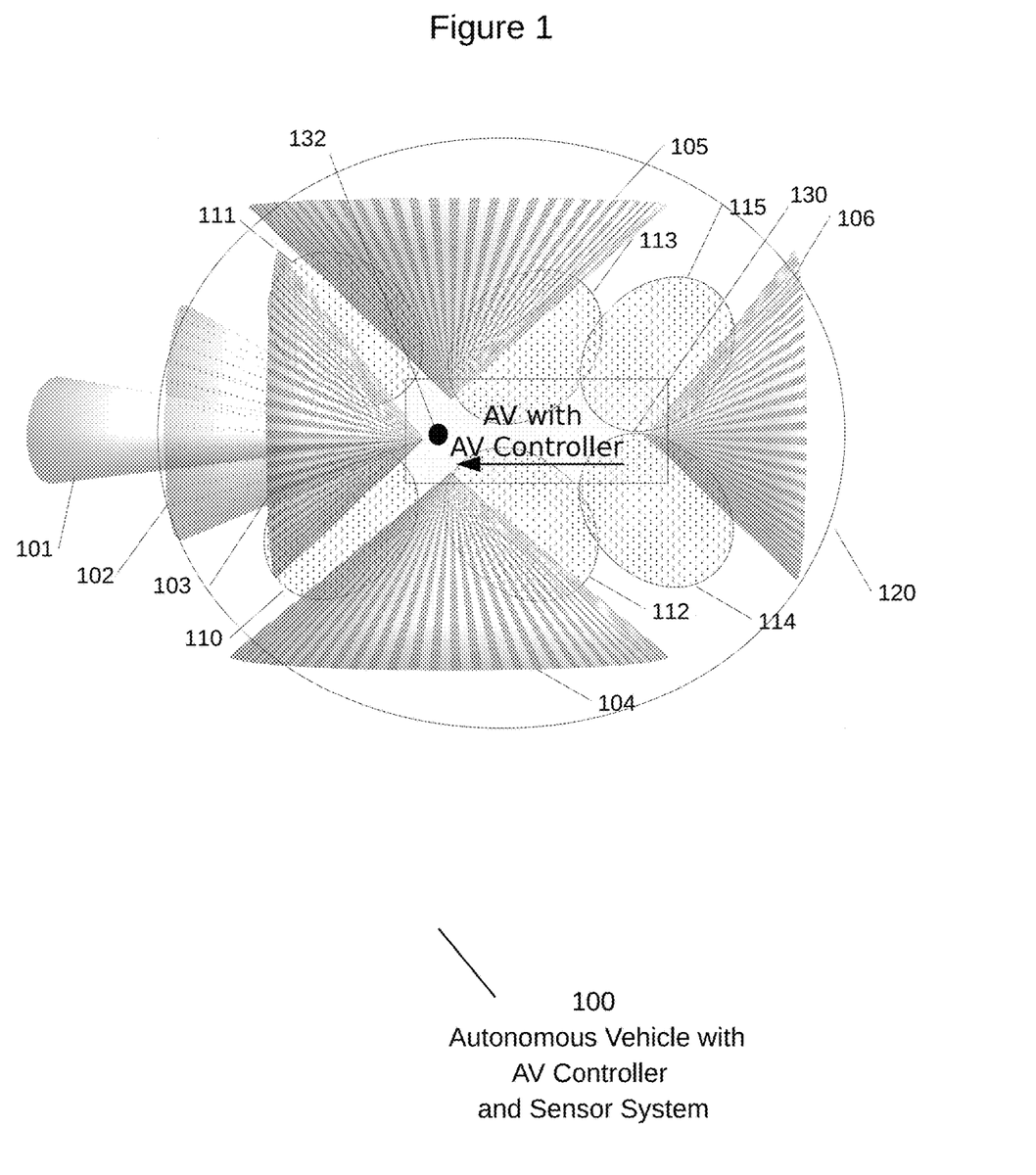
FIG. 1 is a block diagram showing a typical Autonomous Vehicle with AV Controller and Sensor System in which the present invention may be implemented.

With reference now to the figures, and in particular with reference to FIG. 1, a block diagram depicting a typical Autonomous Vehicle (AV) with AV Controller and Sensor System 100 in which the present invention may be implemented. Those of ordinary skill in the art will appreciate that the AV Controller and the sensor systems may vary according to the manufacturer, design requirements, requirements mandated by local and federal regulatory bodies, as well as intended usage. Depicted in FIG. 1 is an autonomous vehicle with AV Controller 130 and the various sensors currently being designed for autonomous vehicles; direction of forward travel is indicated by arrow. These diagrams show long range radar sensor coverage 101, medium radar coverage 104, 105, and 106, camera coverage 102, short range radar coverage 103, ultrasonic sensor coverage 110, 111, 112, 113, 114, and 115, and omnidirectional sensor coverage 120 generated by the omnidirectional sensor 132. The omnidirectional sensor may represent a GPS/GNSS, LIDAR, V2X, LSS, RF, or a combination of these (or other technology types). i.e., an AV could support multiple omnidirectional technologies each having dedicated sensors, or sensors integrated with multiple technologies. A LSS (Lawful Stop and Search) sensor, either dedicated or integrated with other sensor technology may be implemented as a single mode or as a multi-mode sensor as design demands.

Figure 2:
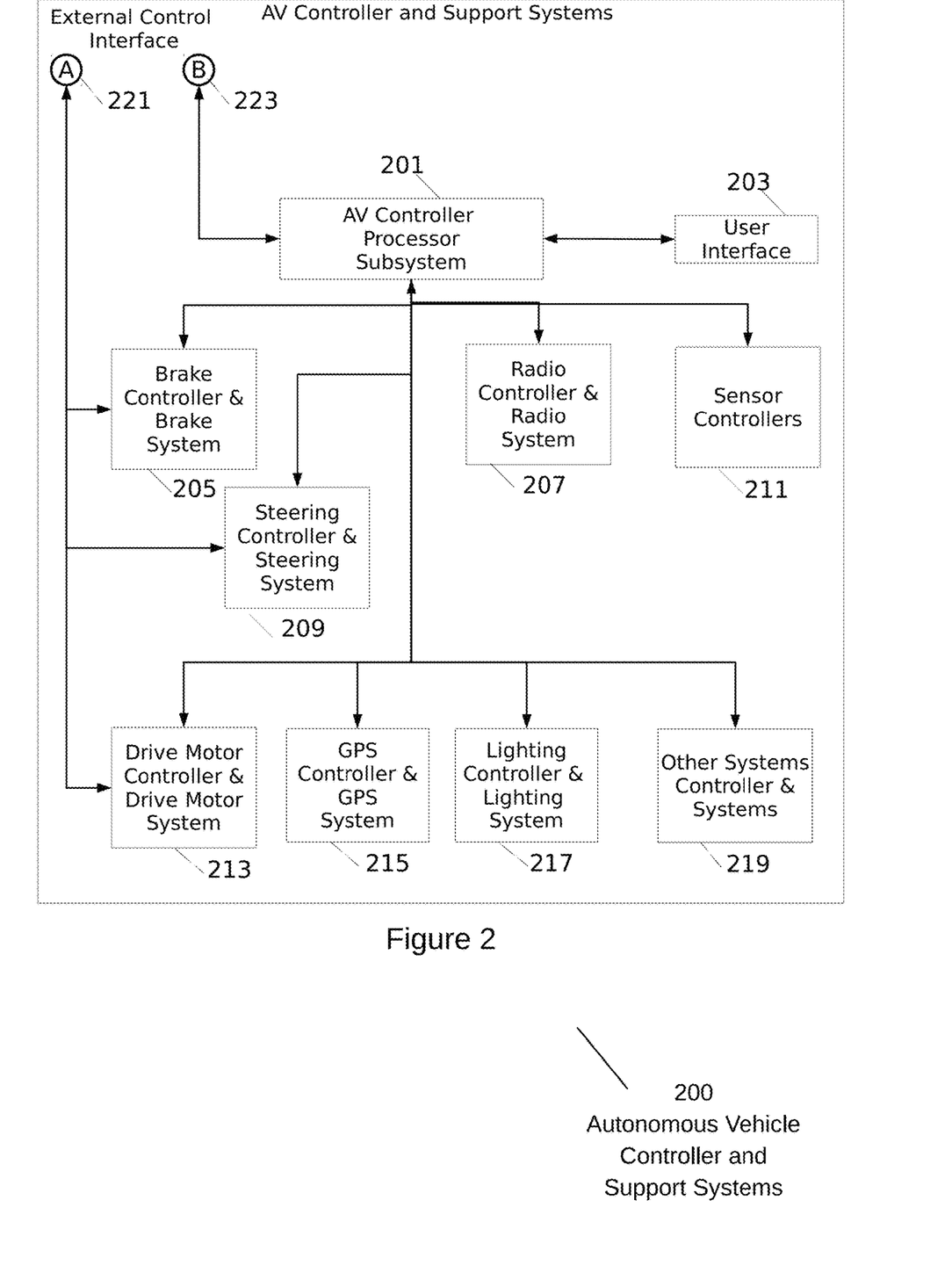
FIG. 2 is a block diagram showing details of a typical Autonomous Vehicle Controller and Support Systems in which the present invention may be implemented.
Figure 3:
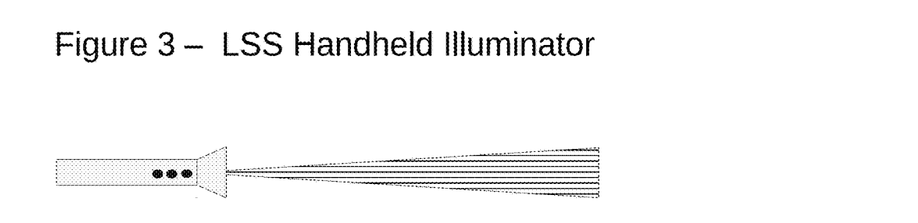
FIG. 3 depicts a handheld Lawful Stop and Search (LSS) illuminator.
Figure 4:
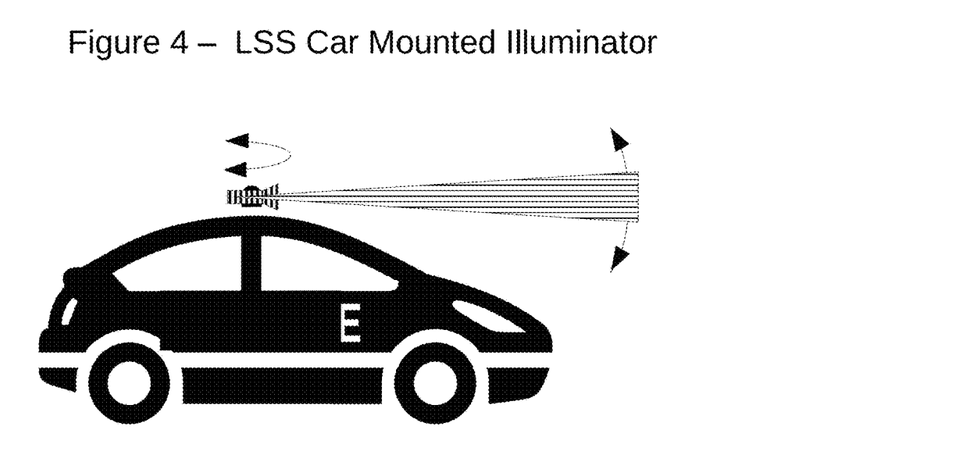
FIG. 4 depicts a car mounted Lawful Stop and Search (LSS) illuminator.
Figure 5:
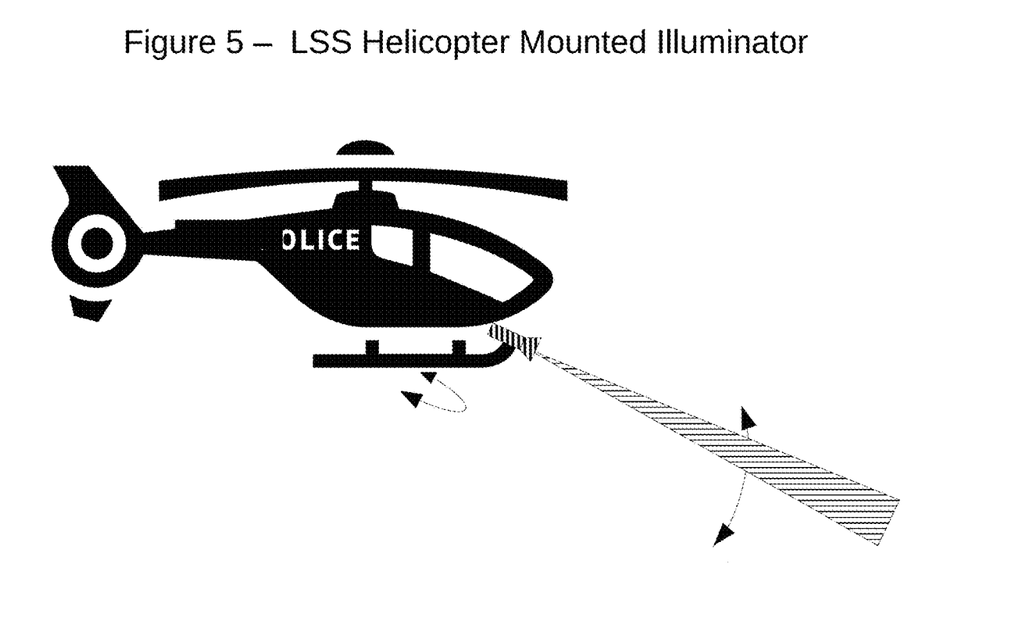
FIG. 5 depicts a helicopter mounted Lawful Stop and Search (LSS) illuminator.

With reference now to FIG. 2, a block diagram depicting a typical Autonomous Vehicle (AV) Controller and Support Systems 200 in which the present invention may be implemented. Those of ordinary skill in the art will appreciate that the AV Controller and Support systems may vary according to the manufacturer, design requirements, requirements mandated by local and federal regulatory bodies, as well as intended usage. Depicted in FIG. 2 is the autonomous vehicle controller processor subsystem 201 providing the main processing resources and external interface, the User Interface 203 that provides possible manual interfaces to the controller. Additionally shown are the following systems, the Brake Controller & Brake System 205, Radio Controller & Radio System 207, Steering Controller & Steering System 209, Sensor Controllers 211, Drive Motor Controller & Drive Motor System 213, GPS Controller & GPS System 215, Lighting Controller & Lighting System 217, Other Systems Controller & Systems 219. The External Control Interfaces 221 and 223 provide both normal control interfaces 223 and emergency control interfaces 221 to the AV Controller. The normal control interface 223 interfaces directly with the AV Controller Processor Subsystem 210 and allows an external controller override the normal autonomous operations. The emergency control interface 221 bypasses the AV Controller Processor Subsystem 210 and interfaces directly to the Brake Controller & Brake System 205, Steering Controller & Steering System 209 and Drive Motor Controller & Drive Motor System 213.

With reference now to FIGS. 3, 4, 5 and 6, depictions of a LSS handheld illuminator, a LSS Car Mounted illuminator, a LSS Helicopter Mounted illuminator, and a fixed LSS Fence, in accordance with a preferred embodiment of the present invention. Those of ordinary skill in the art will appreciate that the LSS Car Mounted illuminator and the LSS Helicopter Mounted illuminator will require external mounts that have azimuth and elevation control for pointing; however, this is beyond the scope of the present invention. Typically, law enforcement personnel will operate the LSS illuminators as part of an intervention process when an AV must be stopped for inspection or where other means have failed or deemed unusable or unsafe. The LSS illuminator is used to signal the AV that authorized personnel are overriding AV control. A LSS illuminator may be a single mode, or multi-mode device; multi-mode may allow different modes to be selectable or all modes may be used simultaneously. Additionally, each Illuminator depicted may be integrated into other systems already required; e.g. the LSS handheld illuminator could be integrated into a flashlight, the LSS Car Mounted illuminator could be integrated into the vehicle's emergency lighting. Those of ordinary skill in the art will appreciate that these modes may vary according to the manufacturer, design requirements, requirements mandated by local and federal regulatory bodies, as well as intended usage and range. Typical modes would be visible laser, infrared laser, ultrasonic, Radio Frequency (RF) and/or other applicable technologies; multi-mode devices would utilize two or more of these (or two or more frequencies), either selectably or simultaneously.

Figure 6:
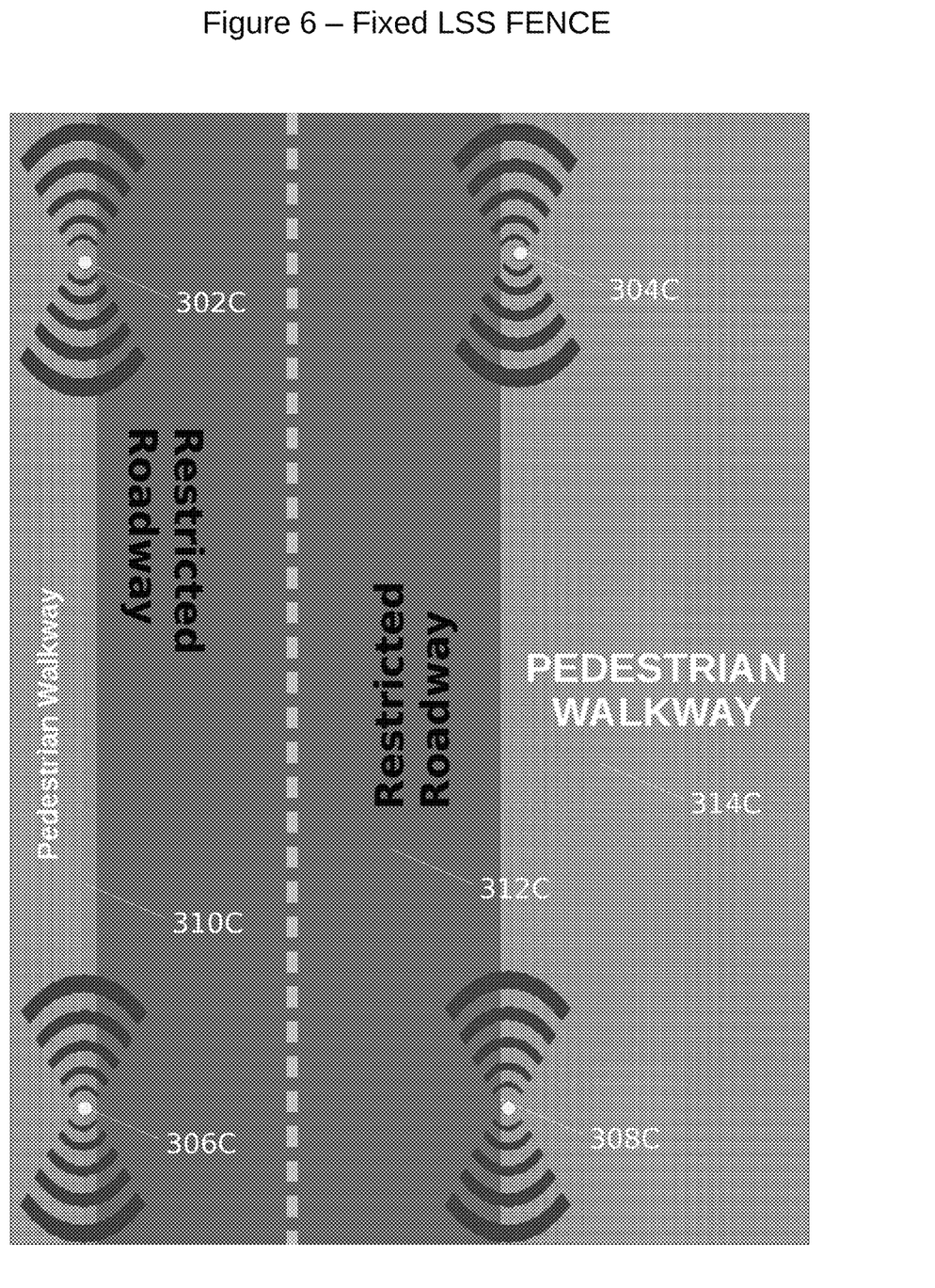
FIG. 6 is a diagram depicting a Fixed LSS Fence, an electronic fence using Lawful Stop and Search (LSS) illuminators.

With reference now to FIG. 6 a concept drawing of a restricted area consisting of Restricted Roadway 312C, Pedestrian Walkways 310C and 314C. These areas are protected by an electronic fence consisting of LSS Illuminators 302C, 304C, 306C, and 308C, each transmitting a "Fence" command with the GPS coordinates of the restricted area. These coordinates could be the corners of the fenced area or the center and radius as design dictates. Commands are transmit periodically at a high repetition rate during periods of usage, and may be turned off otherwise. The installation could be used to exclude AV from restricted areas, such as large celebrations, and/or large public gatherings.

Figure 7:
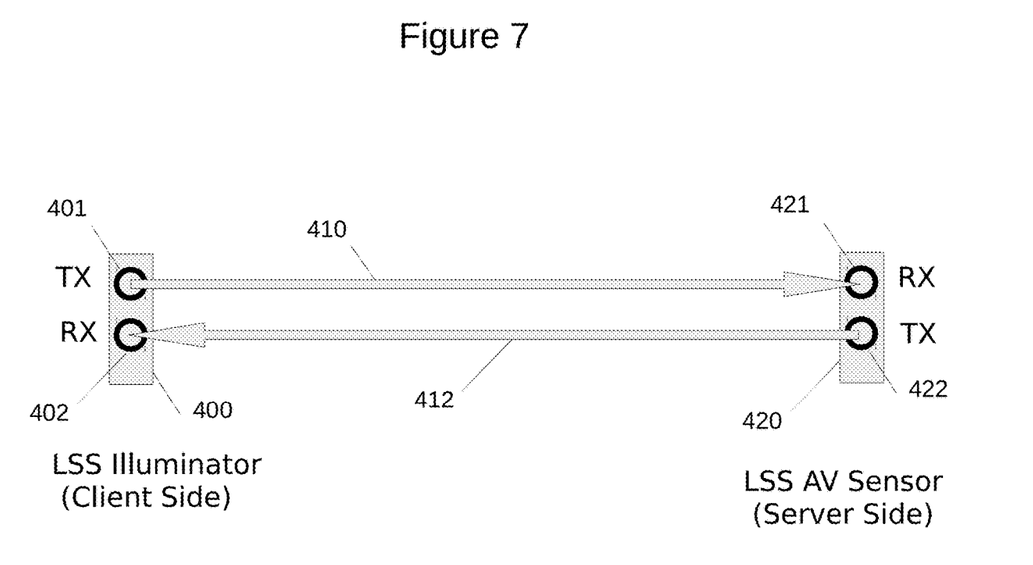
FIG. 7 is a diagram depicting the two way communications where the LSS Illuminator, acting as a client, communicates with a LSS AV Override System Controller, acting as the server, i.e., actively listening for an illuminator.

With reference now to FIG. 7, a depictions of the communications path between a LSS illuminator 400 and a LSS AV Sensor 420 showing the two way nature of communication in accordance with a preferred embodiment of the present invention. In this depiction, the communications may be visible laser, infrared laser, ultrasonic, Radio Frequency (RF) and/or other applicable technologies. Those of ordinary skill in the art will appreciate that one way communication cannot provide the required level of security to prevent LSS misuse, e.g., malicious or criminal hacking and/or pranking, load hijacking, competitor interference, etc.; therefore, a two way encrypted communication channel with mutual authentication is established to meet the applicable standards to guarantee LSS user identification and authentication, message integrity, message confidentiality, non-repudiation of origin and non-repudiation of receipt. LSS user identification and authentication is necessary to guarantee unauthorized interference to the AV, message integrity is required to ensure the message is received correctly so it may be interpreted properly, and message confidentiality is required to prevent spoofing of LSS messages or other hacking techniques. Non-repudiation of origin is required to ensure the AV's owner/dispatcher has sufficient records to know who and why the AV was stopped and non-repudiation of receipt is required so the origin (ownership) of the AV can be verified.

Depicted in FIG. 7 are LSS illuminator 400 with Transmitter (TX) 401 and Receiver (RX) 402, and LSS AV Sensor 420 with Receiver (RX) 421 and Transmitter (TX) 422. LSS AV Sensor 420 acts as a server, listening for a LSS illuminator 400 communication to be initiated via Receiver 421; its Transmitter 422 is inactive. When LSS illuminator 400 is activated it initiates a Transport Layer Security version 1.2 (TLSv1.2) handshake with mutual authentication; if the LSS AV Sensor 420 Receiver 421 is in its beam 410 as shown, the LSS AV Sensor 420 responds via Transmitter 422 and completes the handshake. Immediately after the handshake is completed, the LSS illuminator 400 transmits command(s) and waits on a response from the LSS AV Sensor 402. When the command(s) are acknowledged, the LSS illuminator 400 issues a TLSv1.2 shutdown command to terminate the link; this ends the TLS session. Those of ordinary skill in the art will appreciate that protocols other than TLSv1.2 may be used to achieve the necessary link security; however, they will also recognize non-repudiation of origin and non-repudiation of receipt are required whether provided as an extension to TLS or as part of the application layer.

Typical necessary commands (or their equivalent) that are envisioned are the emergency commands, "EmergencyStop", "Stop", and "Fence", and the normal commands, "Acknowledge", "Identify", "Manifest", "PullOverPark", and "ResumeOperation"; once the AV is at a full stop, further actions can be initiated via other communication paths. The command "EmergenctStop" is issued only when imminent danger necessitates the AV must apply all means to halt motion; this may necessitate a separate control path be implemented, one that bypasses the AV's controller and operates directly on the motor feed and braking mechanisms. The command "Stop" is issued in situations that require immediate AV halt; however, normal safety rules remain in place except the AV does not need to clear traffic lanes. The command "Fence" is issued in fixed locations that require the AV recognize a restricted area that the AV may not enter, this command transmits the GPS coordinates of its location so the AV may reroute. The command "Acknowledge" requires the AV respond to a sensor query to verify the health of the LSS System. The command "Identify" requires the vehicle return AV identification data. The command "Manifest" requires the AV respond with the current vehicle manifest data. The command "PullOverPark" is intended for normal situations where vehicle inspection e.g., load inspection, vehicle weight, etc., or other lawful stop of the AV is required where the AV needs to be clear traffic lanes. The command "ResumeOperation" is intended to allow the AV continue its operation after interruption; however, no internal AV control may be applied until enabled by receipt of this command. Additionally, some commands could requires sub-commands for added functionality, the "PullOverPark" command could include sub-commands to indicate why the AV was pulled over, e.g., "MobileScale", "LoadInspection", "EquipmentViolation", or others as required. Those of ordinary skill in the art will appreciate that design requirements, regulatory requirements, field experience, etc., may require commands be added, modified, and/or removed.

Figure 8:
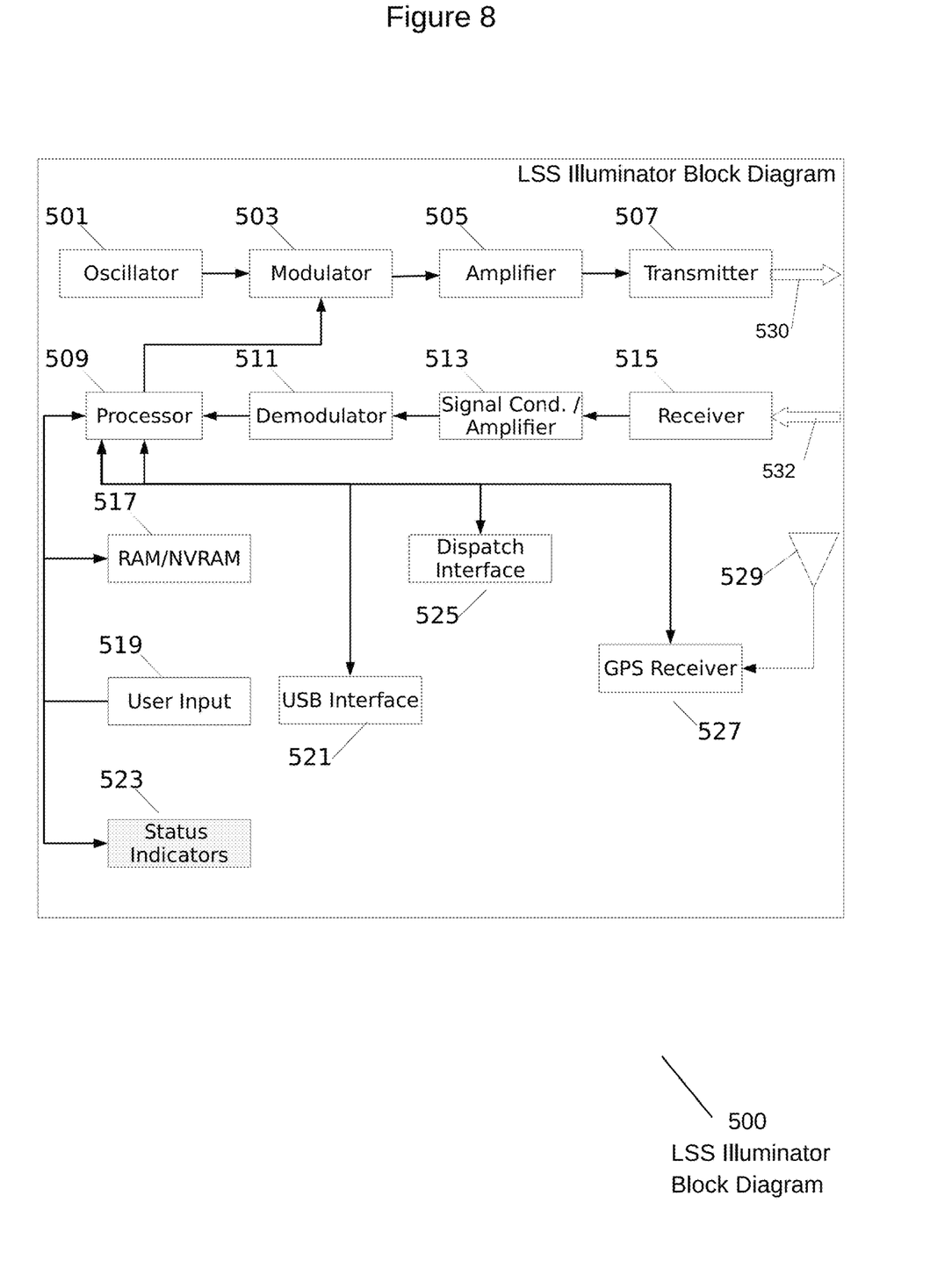
FIG. 8 is a block diagram of an example LSS illuminator electronics.

With reference now to FIG. 8, a block diagram illustrating components of a LSS illuminator 500 used by authorized personnel to mitigate and/or prevent autonomous vehicle misuse is depicted in accordance with a preferred embodiment of the present invention. The LSS illuminator described herein communicates directly with the LSS Sensor described in the paragraph below. In this illustrative example, the components organized into the following subsystems: processing, transmit chain, receive chain, user interface and dispatch interface. Those of ordinary skill in the art will appreciate that the hardware depicted in FIG. 8 may vary; e.g., other components may be used in the transmit and/or receive chain, or other subsystems.

The transmit chain is comprised of Oscillator 501 which generates the carrier frequency, the Modulator 503 which modulates the carrier, Amplifier 505 which amplifies the signal, the Transmitter 507 which emits the modulated beam 530 intended for the LSS Sensor. The receive chain is comprised of the Receiver 515 which receives the modulated beam 532 from the LSS Sensor, Signal Conditioner and Amplifier 513 which synchronizes to the incoming signal and amplifies to the proper level, and Demodulator 511 which recovers the information content from the modulated carrier wave and sends for processing. The processing chain is comprised of Processor 509, and the RAM/NVRAM 517. The Processor 509 performs all processing tasks including generating transmit signals, interpreting receive signals, user input/output functions, and interfacing to dispatch; it interfaces to RAM/NVRAM 517 where program and data are stored, interfaces to USB Interface 521 which provides means to load necessary system data, reads User Input 519, drives Status Indicators 523, and drives the Dispatch Interface 525 which insures all device (LSS Illuminator) usage is externally monitored to preserve usage records. Optionally, for electronic fence applications, a GPS Receiver 527 and GPS Antenna 529 can be integrated. It is recommended high-accuracy GPS be implemented.

Figure 9:
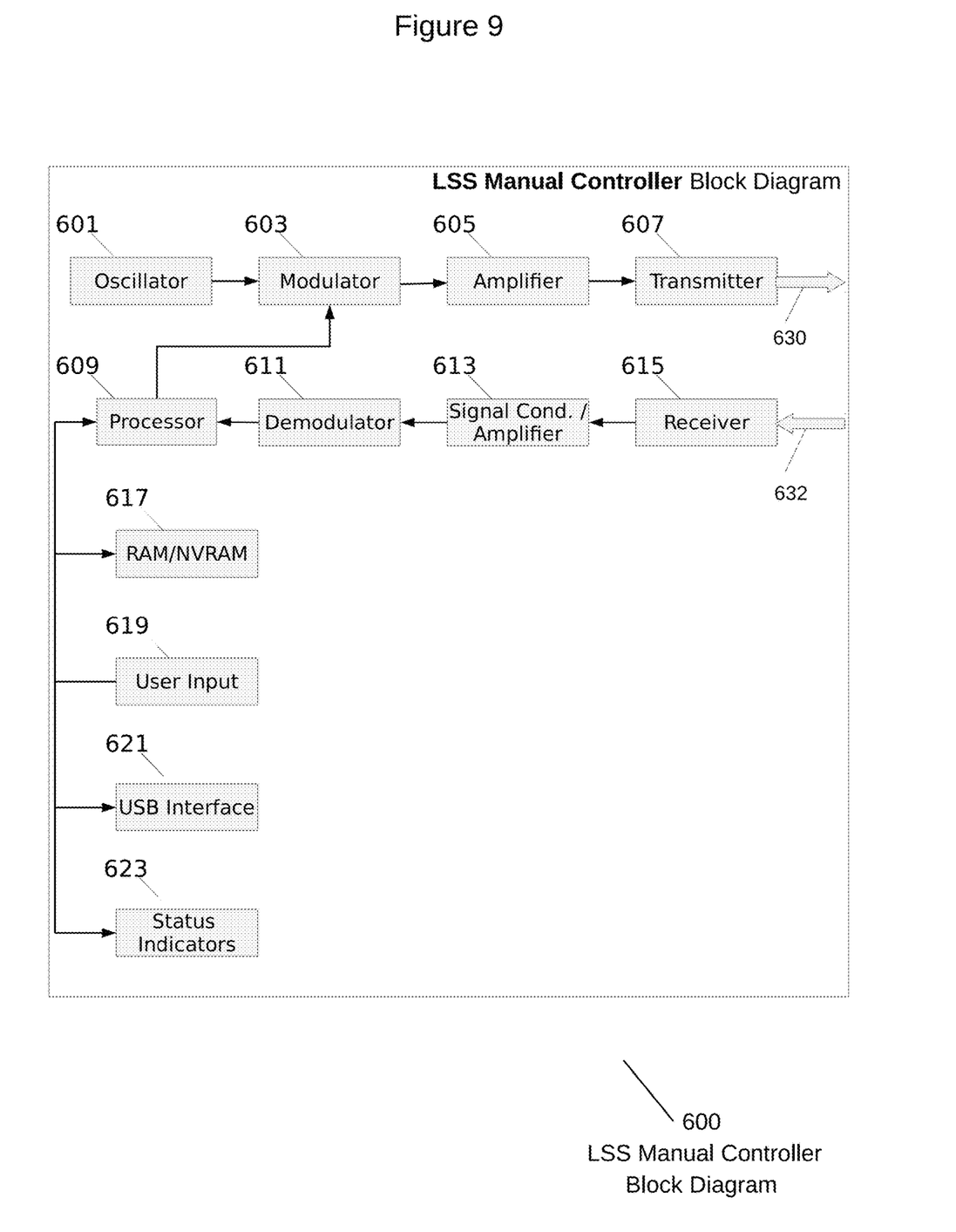
FIG. 9 is a block diagram of an example LSS Manual Controller electronics.

With reference now to FIG. 9, a diagram illustrating components of an LSS Manual Controller 600 intended to communicate with the AV and used to manage the autonomous vehicle is depicted in accordance with a preferred embodiment of the present invention. The LSS Manual Controller described herein communicates directly with the LSS AV Override System via an attached cable or by wireless link; the details of cable or wireless link are not illustrated. In this illustrative example, the components organized into the following subsystems: processing, transmit chain, receive chain, and user interface. Those of ordinary skill in the art will appreciate that the hardware depicted in FIG. 9 may vary; e.g., other components may be used in the transmit and/or receive chain, or other subsystems.

The transmit chain is comprised of Oscillator 601 which generates the carrier frequency, the Modulator 603 which modulates the carrier, Amplifier 605 which amplifies the signal, the Transmitter 607 which emits the modulated signal 630 to the LSS AV Override System, either via wired or wireless means. The receive chain is comprised of the Receiver 615 which receives the modulated signal 632 from the LSS AV Override System, again, either via wired or wireless means, Signal Conditioner and Amplifier 613 which synchronizes to the incoming signal and amplifies to the proper level, and Demodulator 611 which recovers the information content from the modulated carrier wave and sends for processing. The processing chain is comprised of Processor 609, and the RAM/NVRAM 617. The Processor 609 performs all processing tasks including generating transmit signals, interpreting receive signals, user input/output functions, and interfacing to dispatch; it interfaces to RAM/NVRAM 617 where program and data are stored, interfaces to USB Interface 621 which provides means to load necessary system data, reads User Input 619, and drives Status Indicators 623. When LSS Manual Controller 600 is activated it initiates a TLSv1.2 handshake with mutual authentication; immediately after the handshake is completed, the LSS Manual Controller 600 transmits command(s) and waits on a response from the LSS AV Override System. When the command(s) are acknowledged, the LSS Manual Controller 600 issues a TLSv1.2 shutdown command to terminate the link; this ends the TLS session. Those of ordinary skill in the art will appreciate that protocols other than TLSv1.2 may be used to achieve the necessary link security.

Typical necessary commands (or their equivalent) that are envisioned are the proportional commands, "PullForward", "BackUp", "TurnLeft", and "TurnRight" and fixed commands, "Stop", "DownloadVehicleIdentification", "UnlockLoadCompartment", "ContactTerminal", and "ResumeOperation"; proportional commands carry rate information and are used to move the vehicle locally at low rates of speed. The command "Stop" is issued in situations that require immediate AV halt. The command "DownloadVehicleIdentification" is intended for situations where vehicle inspection requires the vehicle produce documentation such as: identification (the motor carrier's name or trade name and the motor carrier's Department of Transportation (DOT) registration number, manifest, proof of insurance, maintenance records, accident records, licenses, permits, planned route and actual route, etc.; this information is downloaded to the controller's USB drive for review and storage. The command "UnlockLoadCompartment" is used to perform vehicle load inspections. The command "ContactTerminal" is intended to notify the vehicle's owner/operator that additional assistance is required. The command "ResumeOperation" is intended to allow the AV continue its operation after interruption; however, no internal AV control may be applied until enabled by receipt of this command. Those of ordinary skill in the art will appreciate that design requirements, regulatory requirements, field experience, etc., may require commands be added, modified, and/or removed.

Figure 10:
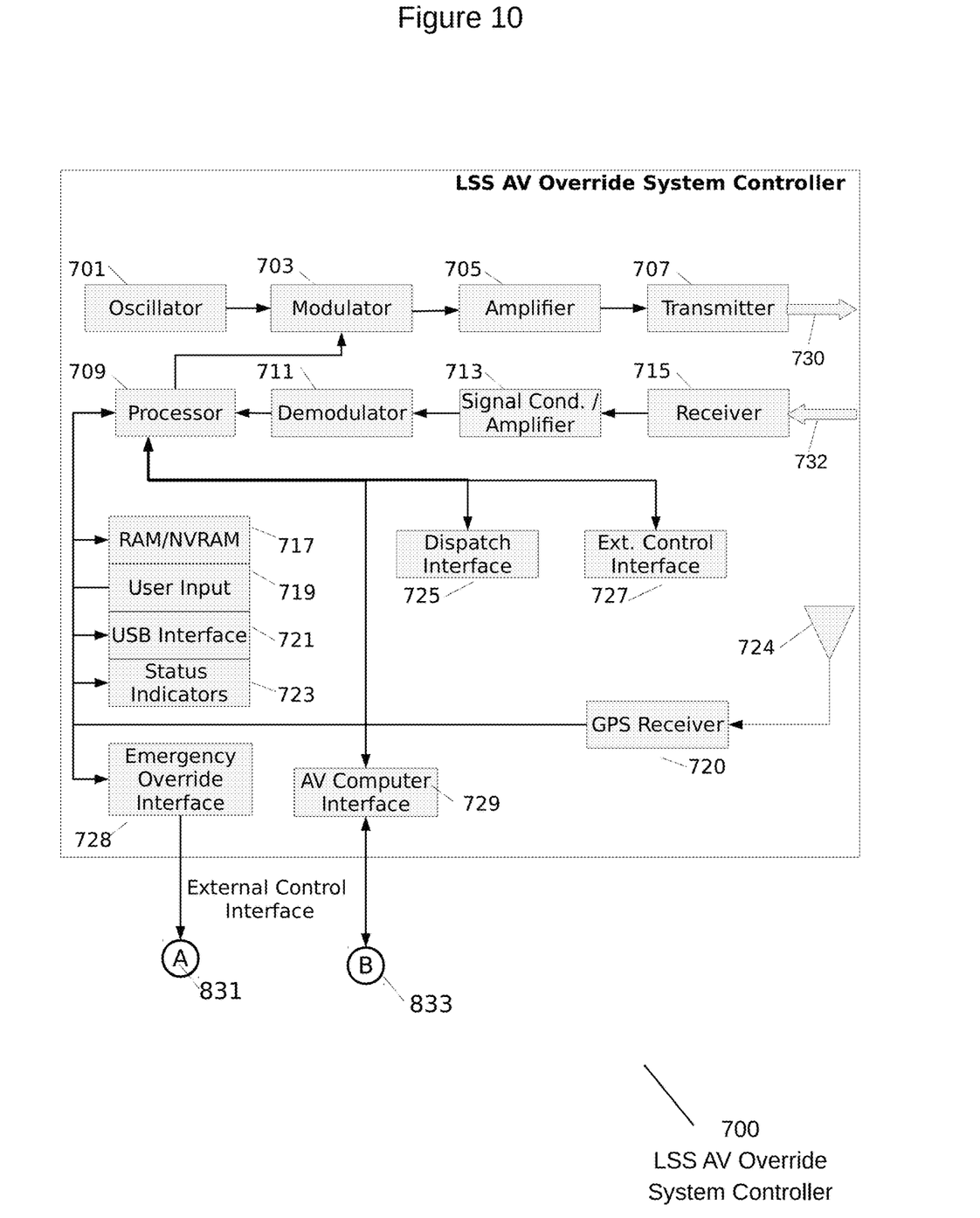
FIG. 10 is a block diagram of an example LSS AV Override System Controller electronics.

With reference now to FIG. 10, a diagram illustrating components of a LSS AV Override System Controller 700 mounted on the AV used to mitigate and/or prevent autonomous vehicle misuse and vehicle management is depicted in accordance with a preferred embodiment of the present invention. The LSS AV Override System described herein communicates directly with the LSS illuminator described in the paragraph above and communicates with the LSS Manual Controller described below. In this illustrative example, the components organized into the following subsystems: processing, transmit chain, receive chain, user interface and dispatch interface; the subsystems may be appropriately separated into physically different enclosures with the transmit and receive chains located in one package mounted on top of the AV and the remainder in a more accessible location. Additionally, the components may be integrated into existing AV sensors such as LIDAR, radar, GNSS, or ultrasonic, etc.; furthermore, significant anti-tampering characteristics of the LSS AV Override System may be gained through the use of integrated sensors. e.g., if an integrated LSS/LIDAR sensor were tampered, the LIDAR system would also be downgraded and the system fail. Additionally, some components, such as receiver and/or transmitter, may be integrated into the vehicle's running, braking, or emergency lighting. Those of ordinary skill in the art will appreciate that the hardware depicted in FIG. 10 may vary, e.g., other components may be used in the transmit and/or receive chain, or other subsystems.

The transmit chain is comprised of Oscillator 701 which generates the carrier frequency, the Modulator 703 which modulates the carrier, Amplifier 705 which amplifies the signal, the Transmitter 707 which emits the modulated beam 730 intended for the LSS Illuminator. The receive chain is comprised of the Receiver 715 which receives the modulated beam 732 from the LSS Illuminator, Signal Conditioner and Amplifier 713 which synchronizes to the incoming signal and amplifies to the proper level, and Demodulator 711 which recovers the information content from the modulated carrier wave and sends for processing. The processing chain is comprised of Processor 709, and the RAM/NVRAM 717. The Processor 709 performs all processing tasks including generating transmit signals, interpreting receive signals, user input/output functions, and interfacing to dispatch; it interfaces to RAM/NVRAM 717 where program and data are stored, interfaces to USB Interface 721 which provides means to load necessary system data, reads User Input 719, drives Status Indicators 723, and drives the Dispatch Interface 725 which insures all device (LSS Illuminator) usage is externally monitored to preserve usage records, interfaces to the External Control Interface 727 which allows the AV be controlled by an external device, and interfaces to the AV Computer Interface 729 which sends override commands to the AV control system computer, or to a separate control implemented to bypasses the AV's controller and operates directly on the motor feed and braking mechanisms via the Emergency Override Interface 728.

A high-accuracy GPS Receiver 720 and GPS Antenna 724 provide accurate LSS location data that is independent of the AV control system. LSS location data is used in conjunction with "Fence" commands received from LSS electronic fence installations. As the vehicle approaches a restricted area marked with the LSS fence, the AV controller may be notified to avoid the restricted area. In the case the LSS AV Override System detects actual AV intrusion into a LSS electronic fenced area, the vehicle is reliably stopped by bypassing the AV's controller via the Emergency Override Interface 728, operating directly on the motor feed and braking mechanisms. Once the AV has been stopped using the Emergency Override Interface 728, it can only be restarted by law enforcement. LSS AV Override System location data can also be sent to the AV control system to increase its reliability. To reduce misuse and increase route reliability, the Native AV Controller can transmit the route map to the LSS AV Override System via the AV Computer Interface 729 where the route is continuously checked by the LSS Override System. Small route deviations can be transmit back to the AV controller for correction resulting in higher route reliability, whereas large route deviations will result in activation of the Emergency Override Interface and subsequent AV stop. Those of ordinary skill in the art will appreciate that the LSS AV Override System and all interfaces to the AV must have sufficient physical and logical protection to prevent misuse and/or tampering; therefore, manufacturers should consider FIPS 140-2 Level 4 certification or its equivalent.

With reference now to FIG. 8, a diagram illustrating components of a LSS illuminator 500 and FIG. 9, a diagram illustrating components of an LSS Manual Controller 600, show significant similarities such that the handheld LSS Illuminator and a LSS Manual Controller may be integrated into a single package.

Figure 11:
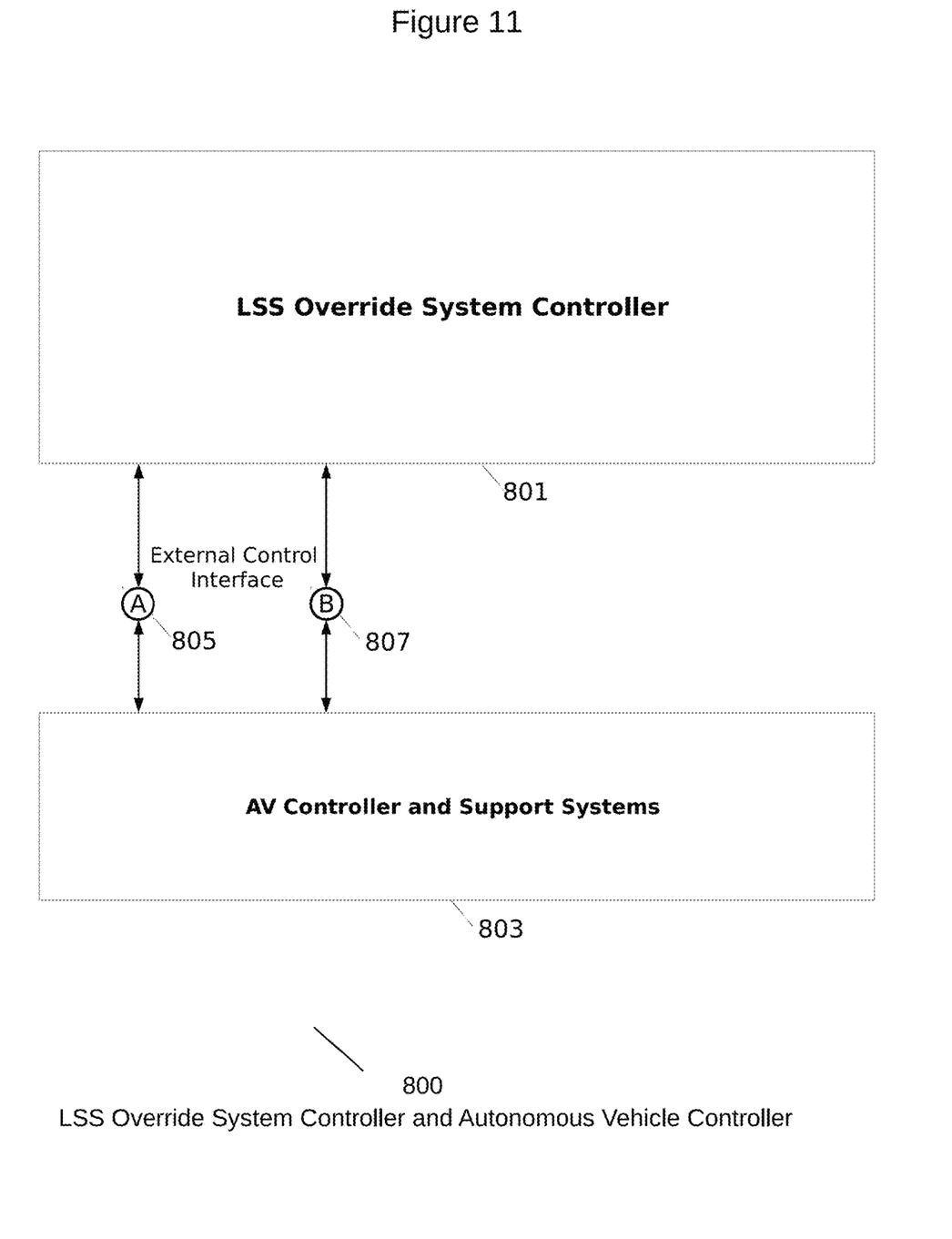
FIG. 11 is a block diagram showing details of a LSS Override System Controller interfaces to a typical Autonomous Vehicle Controller.

With reference now to FIG. 11, a block diagram of a LSS Override System Controller and Autonomous Vehicle Controller 800 showing the relationship and connections between the LSS Override System Controller 801, the AV Controller and Support System 803, and the External Control Interfaces 805 and 807. The LSS Override System Controller 801 is purposefully shown above the AV Controller and Support System 803 because it can override the AV Controller and Support System 803 which must respond to the direction of LSS Override System Controller 801.

The LSS Override System Controller 801 is fully explained in the description of FIG. 10 above, the AV Controller and Support System 803 and the External Control Interfaces 805 and 807 are fully explained in the description of FIG. 2.

Figure 12:
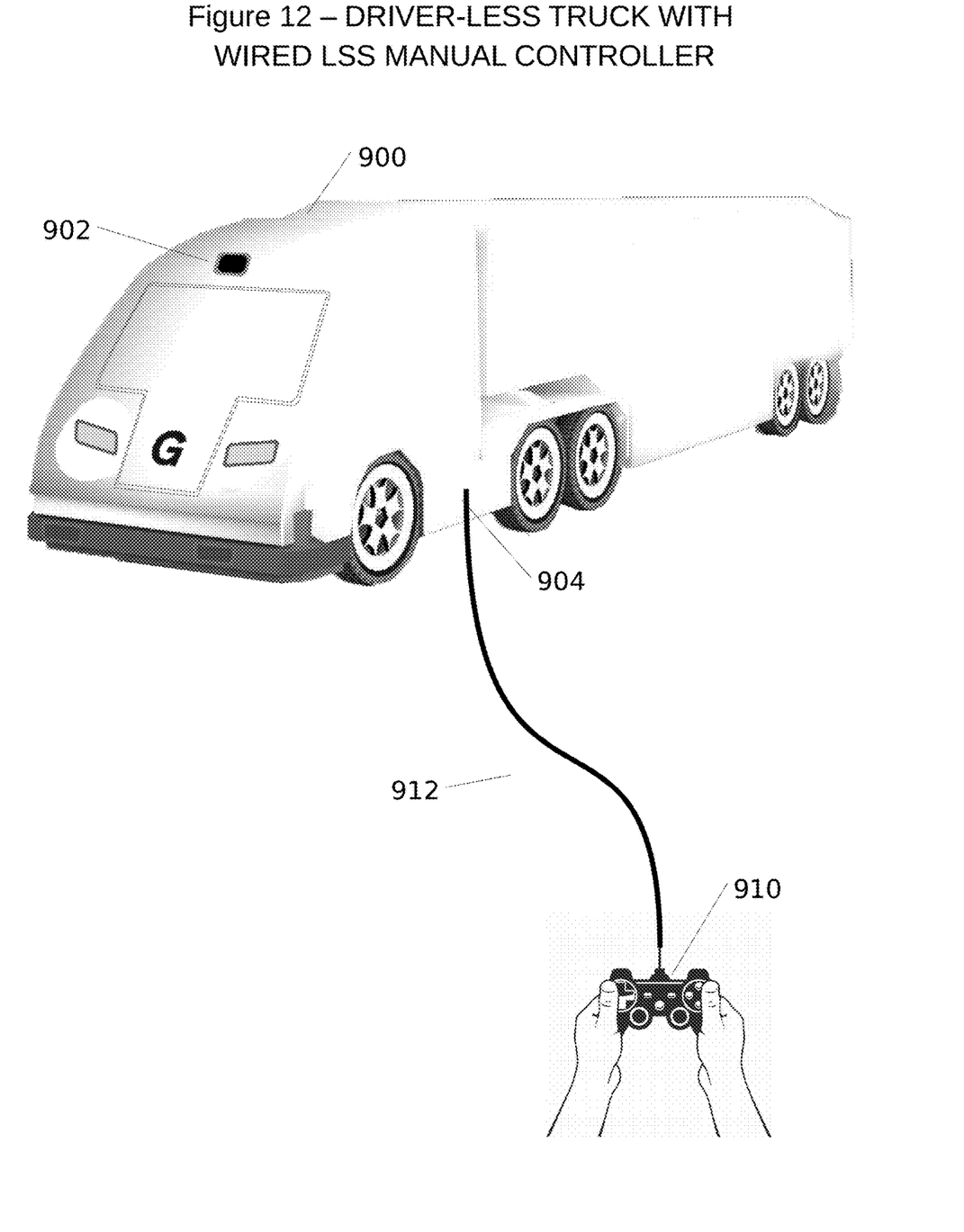
FIG. 12 is a diagram depicting a driver-less AV with wired LSS Manual Controller.

With reference now to FIG. 12, a concept drawing of a driver-less AV 900 having LSS Sensor 902 and Control Port 904 depicted in accordance with a preferred embodiment of the present invention. LSS Sensor 902 may be an independent sensor, or may be integrated into the AV navigation sensors such as LIDAR, RADAR, camera or other; however, integrated sensors offer increased anti-tampering security, and are therefore preferred. Control Port 904 is depicted with attached Control Cable 912 and LSS Manual Controller 910; Control Port 904 is attached internally to the External Control Interface 527 shown in FIG. 8. LSS Control Cable 912 and LSS Manual Controller 910 are attached to provide local management of the AV 900 after the AV has stopped. Upon connection of LSS Manual Controller 910, all internal control functions are overridden, including remote AV control via other pathways.

Figure 13:
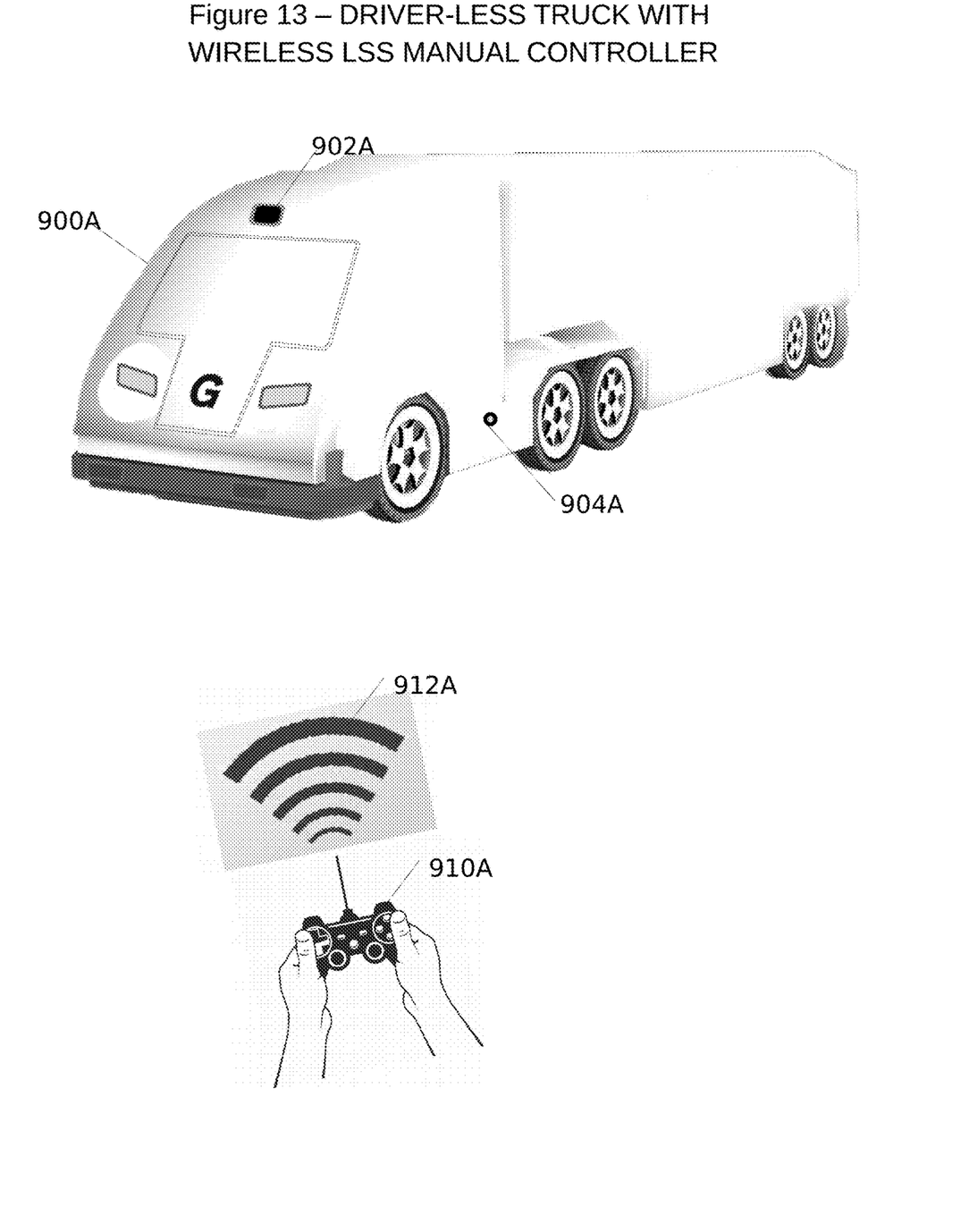
FIG. 13 is a diagram depicting a driver-less AV with wireless LSS Manual Controller.

With reference now to FIG. 13 a concept drawing of a driver-less AV 900A having LSS Sensor 902A and Control Port 904A depicted in accordance with an alternate embodiment of the present invention. LSS Sensor 904A may be an independent sensor, or may be integrated into the AV navigation sensors such as LIDAR, RADAR, camera or other; however, integrated sensors offer increased anti-tampering security, and are therefore preferred. The LSS Manual Controller 920A communicates to the LSS Sensor 902A via wireless signal and provides local management of the AV 900A after stopped. Upon establishment of LSS Manual Controller 910A control, all internal control functions are overridden, including remote AV control via other pathways. Control Port 904A is unused in this example.

With reference now to FIG. 12 and FIG. 13, whether wired or wireless, the AV can be moved locally as necessary using the LSS Manual Controller; in terminal this can aid in vehicle maintenance, vehicle fueling for non-electric vehicles such as diesel or hydrogen fuels, and charging for electric vehicles, load and unload tasks, in transit this can aid in mobile or Port of Entry weight inspections, and/or load inspection. Additional the AV Controller can be used in terminal for final inspection to verify route information, and verify all required documentation is present, available, and correct. Although a driver-less AV was used in these examples, those of ordinary skill in the art will appreciate that the AV could be with driver present, with driver facilities but no driver, or driver-less, i.e., no driver facilities, as this will probably be the development sequence for fully autonomous driver-less vehicles.

The descriptions of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Definitions:

| | |
|---|---|
| AV | Autonomous Vehicle, for the purposes of this invention, refers to SAE specification J3016, Level 2 and higher vehicle. |
| Federal Information Processing Standards | Publicly announced standards developed by the United States federal government for use in computer systems by non-military government agencies and government contractors. |
| FIPS | See Federal Information Processing Standards |
| Global Navigation Satellite System | The standard generic term for satellite navigation systems that provide autonomous geo-spatial positioning with global coverage. |
| Global Positioning System | The US Government's implementation of GNSS |
| GNSS | See Global Navigation Satellite System |
| GPS | See Global Positioning System |
| IAS | See Intrusion Analysis Software |
| Lawful Stop and Search | Refers to a situation where law enforcement may legally request a vehicle to pull over and search (inspect) the vehicle |
| LSS | See Lawful Stop and Search |
| LIDAR | An acronym for Light Detection and Ranging, which is a remote sensing method that uses pulsed laser light to perform range measurements; it is and for control and navigation for autonomous vehicles. |
| National Institute of Standards and Technology | A United States government non-regulatory federal agency Department of Commerce; its mission is to promote US. innovation and industrial competitiveness by advancing measurement science, standards, and technology in ways that enhance economic security and improve our quality of life. |
| NIST | See National Institute of Standards and Technology |
| SAE | Society of Automotive Engineers |
| V2I | Vehicle to Infrastructure |
| V2V | Vehicle to Vehicle |
| V2X | V2I and V2V |

What is claimed is:

1. A Lawful Stop and Search (LSS) Override Controller for an autonomous vehicle, the controller comprising:
   a first physical communication channel to receive commands from and respond to a LSS Manual Controller via a direct wired connection;
   a second physical communication channel comprising:
   a communications sensor system that detects and emits at least one of ultrasonic, optical, and radio frequency energy; and
   a receiver/transmitter coupled to the communications sensor system to receive commands from and respond to a LSS Illuminator or the LSS Manual Controller;
   a logical command communications link coupled to the first and second physical communication channels that employs a secure communication protocol configured to concurrently communicate to said LSS handheld Illuminator and said LSS Manual Controller;
   an AV Computer interface to an automated driving system (ADS) controller that provides default control of said autonomous vehicle;
   an Emergency Override Interface to a drive motor system, a braking system, and a steering system of said autonomous vehicle, bypassing the ADS, controller thereby providing direct control of said drive motor, brakes, and steering;
   a dispatch interface configured to communicate with said autonomous vehicle's dispatch;
   a global positioning system (GPS) receiver configured to determine the vehicle coordinates, velocity and precise time; and
   a processor using said secure communication protocol to perform mutual authentication.

2. The LSS Override Controller of claim 1, wherein the secure communication link protocol between the LSS Override Controller and the LSS Illuminator or the LSS Manual Controller includes at least one of the following characteristics: message confidentiality, message integrity, end-point mutual authentication, reliability, and perfect forward secrecy.

3. The LSS Override Controller of claim 1, wherein the processor employs said secure communication protocol to provide mutual authentication to determine the verifiable identity of an entity using the LSS Illuminator or the LSS Manual Controller, and determine the authority of said entity to assert control over said autonomous vehicle.

4. The LSS Override Controller of claim 1, wherein the processor employs the secure communication protocol to send digitally signed messages to the LSS Illuminator or the LSS Manual Controller to provide non-repudiation of message receipt.

5. The LSS Override controller of claim 1, wherein contingent upon said mutual authentication the processor automatically acknowledges and complies with at least one of the following commands:
   "EmergencyStop", "Stop", "Fence", "Acknowledge", "Identify", "Manifest", "PullOverPark", and "ResumeOperation".

6. The LSS Override Controller of claim 1, wherein contingent upon receipt and execution of one of the following commands from said LSS Illuminator: "EmergencyStop", "Stop", and "PullOverPark", resulting in the complete halt of said autonomous vehicle, the LSS Override Controller will only then respond to only a first set of commands received from the LSS Manual Controller wherein the set of commands includes at least: "PullForward", "BackUp", "TurnLeft", "TurnRight", "Stop", "DownloadVehicleIdentification", "UnlockLoadCompartment", "ContactTerminal", and "ResumeOperation".

7. The LSS Override Controller of claim 6, wherein contingent only upon receipt of the "ResumeOperation" command, with no interaction from other entities, the processor will immediately return control to said ADS controller that provides default control of the autonomous vehicle.

8. A lawful stop and search (LSS) Illuminator comprising:
a physical communication channel comprising:
a communications sensor system that emits an detects at least one of ultrasonic, optical, and radio frequency energy; and
a transmitter/receiver coupled to the communications sensor system to transmit commands to and receive responses from a LSS Override Controller;
a logical commands communications link coupled to the physical communication channel that employs a secure communication protocol configured to communicate to said LSS Override Controller;
a USB interface providing means to load necessary system data including program code, public key infrastructure (PKI) certificate chain, private certificate, and other critical security parameters;
a dispatch interface configured to communicate usage records with law enforcement dispatch including the lawful stop and search location and precise time;
a global positioning system (GPS) receiver configured to determine the LSS Illuminator coordinates and precise time;
a set of RAM and NVRAM memory devices, wherein the memory is used to securely store program code, operation data and usage data; and
a processor using said secure communication protocol to perform mutual authentication.

9. The LSS Illuminator of claim 8, wherein the processor is configured to issue one or more commands via the command communications link, the one or more commands being from a command set that includes at least: "EmergencyStop", "Stop", "Fence", "Acknowledge", "Identify", "Manifest", "PullOverPark".

10. The LSS Illuminator of claim 8, wherein the communications link protocol between LSS Illuminator and LSS Override Controller includes at least one of the following characteristics: message confidentiality, message integrity, mutual authentication, reliability, and perfect forward secrecy .

11. The LSS Illuminator of claim 8, wherein the secure communication protocol employs FIPS approved algorithms to provide said mutual authentication.

12. The LSS Illuminator of claim 8, wherein the messages to the LSS Override Controller to provide non-repudiation of origin of the commands from an entity using the LSS Illuminator directing operation of the autonomous vehicle.

13. The LSS Illuminator of claim 8, further comprising an external casing integrated with a flashlight that renders the LSS Illuminator operable as a multi-function handheld device.

14. The LSS Illuminator of claim 8, wherein the transmitter is integrated with a law enforcement vehicle emergency lights and is steerably mounted to said law enforcement vehicle.

15. The LSS Illuminator of claim 8, wherein, the processor issuing a "Fence" command via the command communications link, the "Fence" command including the GPS coordinates, expressed as a combination of latitude and longitude, that define a restricted area.

16. A lawful stop and search (LSS) Manual Controller that comprises:
a first physical communication channel to send commands to and receive responses from a LSS Override Controller via a direct wired connection;
a second physical communication channel comprising:
a wireless communications sensor system that emits and detects radio frequency energy; and
a transmitter/receiver coupled to the communications sensor system to transmit commands to and receive responses from a LSS Override Controller;
a logical command communications link coupled to the first and second physical communication channels that employs a secure communication protocol configured to communicate to said to the LSS Override controller;
a dispatch interface configured to communicate with law enforcement dispatch including the lawful stop and search location and precise time; and
a processor using said secure communication protocol to perform mutual authentication.

17. The LSS Manual Controller of claim 16, wherein, the processor is configured to issue one or more commands via the command communications link, the one or more commands being from a command set that includes at least: "PullForward", "BackUp", "TurnLeft", "TurnRight", "Stop", "DownloadVehicleIdentification", "UnlockLoadCompartment", "ContactTerminal", and "ResumeOperation".

18. The LSS Manual Controller of claim 16 wherein the secure communication protocol between the LSS Manual Controller and LSS Override Controller includes at least one of the following characteristics: message confidentiality, message integrity, mutual authentication, reliability, and perfect forward secrecy.

19. The LSS Manual Controller of claim 16, wherein the secure communication protocol employs FIPS approved algorithms to provide said mutual authentication.

20. The LSS Manual Controller of claim 16, wherein the processor employs the secure communication protocol to send digitally signed messages to the LSS Override Controller to provide non-repudiation of origin of the commands from the user of the LSS Manual Controller directing operation of the autonomous vehicle.

21. The LSS Manual Controller of claim 16, wherein the command communications link between LSS Manual Controller and LSS Override Controller is conveyed by at least one of: a direct wired connection or a directed beam of ultrasonic, optical, or radio frequency energy.

22. A lawful stop and search (LSS) enforcement method that comprises:
illuminating a LSS Override Sensor on an autonomous vehicle with a LSS Illuminator emitting at least one of, a focused beam of ultrasonic, optical, or radio frequency energy that includes a modulated signal;
using responses from the LSS Override Controller to establish a command communications link employing a secure communication protocol that, enables the LSS Override Controller verifiable identify an entity using said LSS Illuminator and determine the authority of said entity to direct operation of the autonomous vehicle, and that allow the LSS Illuminator determines the verifiable legal ownership of the autonomous vehicle;
issuing at least one command for the LSS Override Controller to obey automatically to direct the operation of the autonomous vehicle.

23. The LSS enforcement method of claim 22, wherein the at least one command is selected from a command set that includes at least "EmergencyStop", "Stop", "Fence", "Acknowledge", "Identify", "Manifest", "PullOverPark".

24. The LSS enforcement method of claim 22, wherein the secure communication protocol includes at least one of the following characteristics: message confidentiality, message integrity, mutual authentication, reliability, and perfect forward secrecy.

25. The LSS enforcement method of claim 22, wherein said illuminating includes steering at least one of, a focused beam of ultrasonic, optical, or radio frequency energy from a multi-function handheld device or from a transmitter integrated into the law enforcement vehicle's emergency lights steerably mounted to a law enforcement vehicle.

26. The LSS enforcement method of claim 22, wherein said illuminating includes positioning said LSS Illuminator near a restricted area to exclude the autonomous vehicle, and wherein said at least one command is a "Fence" command that specifies the GPS coordinates, expressed as a combination of latitude and longitude, that define a restricted area.

27. A lawful stop and search (LSS) compliance method that comprises:
    sending via at least one of, a direct wired connection, or a directed beam of ultrasonic, optical, or radio frequency energy that includes a modulated signal from an LSS Manual Controller to an LSS Override Controller;
    detecting and responding to the modulated signal from the LSS Override Controller; using responses from the LSS Override Controller to establish a command communications link employing a secure communication protocol that, enables the LSS Override Controller verifiable identify an entity using said LSS Manual Controller and determine the authority of said entity to direct operation of the autonomous vehicle, and that allow the LSS Manual Controller determines the verifiable legal ownership of the autonomous vehicle;
    issuing at least one command for the LSS Override Controller to obey automatically to direct the operation of the autonomous vehicle.

28. The LSS compliance method of claim 27, wherein if said authority is authenticated, the method further comprises acknowledging and automatically complying with at least one of the following commands: "Stop", "Acknowledge", "Identify", "Manifest", "ResumeOperation", "PullForward", "BackUp", "TurnLeft", "TurnRight", "DownloadVehicleIdentification", "UnlockLoadCompartment", and "ContactTerminal".

29. The LSS compliance method of claim 27, wherein the secure communications link protocol includes at least one of the following characteristics: message confidentiality, message integrity, mutual authentication, reliability, and perfect forward secrecy.

* * * * *